US012675751B2

(12) United States Patent
Gastinger et al.

(10) Patent No.: US 12,675,751 B2
(45) Date of Patent: Jul. 7, 2026

(54) METHOD FOR DECISION-MAKING REGARDING A DECISION IN AN ENVIRONMENT BY MEANS OF A DATA PROCESSING SYSTEM AND A CORRESPONDING DATA PROCESSING SYSTEM

(71) Applicant: NEC Laboratories Europe GmbH, Heidelberg (DE)

(72) Inventors: Julia Gastinger, Heidelberg (DE); Timo Sztyler, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 538 days.

(21) Appl. No.: 18/272,627

(22) PCT Filed: May 14, 2021

(86) PCT No.: PCT/EP2021/062846
§ 371 (c)(1),
(2) Date: Jul. 17, 2023

(87) PCT Pub. No.: WO2022/237987
PCT Pub. Date: Nov. 17, 2022

(65) Prior Publication Data
US 2024/0296347 A1      Sep. 5, 2024

(51) Int. Cl.
*G06N 5/02* (2023.01)
*G06Q 10/06* (2023.01)
*G06Q 10/10* (2023.01)

(52) U.S. Cl.
CPC ............... *G06Q 10/06* (2013.01); *G06N 5/02* (2013.01); *G06Q 10/10* (2013.01)

(58) Field of Classification Search
CPC ........... G06N 5/02; G06Q 10/10; G06Q 10/06
See application file for complete search history.

(56) References Cited

U.S. PATENT DOCUMENTS

| | | | |
|---|---|---|---|
| 12,254,420 B1 * | 3/2025 | Sun | ......................... G06N 5/022 |
| 2013/0290072 A1 | 10/2013 | Ren | |
| 2018/0082183 A1 | 3/2018 | Hertz et al. | |
| 2019/0026372 A1 * | 1/2019 | Lu | ....................... G06F 16/9535 |

(Continued)

FOREIGN PATENT DOCUMENTS

| | | |
|---|---|---|
| CN | 110633861 A | 12/2019 |
| CN | 111292523 A | 6/2020 |
| KR | 2016/0078605 A | 7/2016 |

*Primary Examiner* — Jorge A Casanova
(74) *Attorney, Agent, or Firm* — Leydig, Voit & Mayer, Ltd.

(57) ABSTRACT

A method for decision-making regarding a decision in an environment by a data processing system in view of multiple different objectives includes: collecting information within the environment, describing the information in at least one temporal knowledge graph (TKG), forecasting a future development of one future state or more future states at a future time or more future points in time, under different decisions by the at least one TKG. The method further describes each resulting future state/decision combination by a corresponding temporal knowledge graph, rates an adherence of each forecasted future state to each objective of the multiple different objectives, considers a trade-off between the objectives for decision-making in a time-aware manner; and provides the decision.

20 Claims, 3 Drawing Sheets

(56) References Cited

U.S. PATENT DOCUMENTS

| | | | |
|---|---|---|---|
| 2019/0180358 A1 | 6/2019 | Nandan et al. | |
| 2019/0197158 A1* | 6/2019 | Firooz | G06F 16/313 |
| 2020/0065668 A1* | 2/2020 | Garcia Duran | G06N 3/044 |
| 2020/0225385 A1 | 7/2020 | O'Donncha et al. | |
| 2023/0401466 A1* | 12/2023 | Zhao | G06N 3/045 |
| 2024/0296347 A1* | 9/2024 | Gastinger | G06N 5/02 |
| 2024/0378249 A1* | 11/2024 | Gustavson | G06F 16/9538 |
| 2025/0259082 A1* | 8/2025 | Crabtree | G06N 3/042 |
| 2025/0292107 A1* | 9/2025 | Rossi | G06N 5/02 |
| 2025/0371225 A1* | 12/2025 | Lesnik | G06F 30/27 |
| 2025/0378963 A1* | 12/2025 | Soo | G06N 5/022 |
| 2026/0017301 A1* | 1/2026 | Vieri | G06F 16/3344 |

* cited by examiner

METHOD FOR DECISION-MAKING REGARDING A DECISION IN AN ENVIRONMENT BY MEANS OF A DATA PROCESSING SYSTEM AND A CORRESPONDING DATA PROCESSING SYSTEM

CROSS REFERENCE TO RELATED APPLICATIONS

This application is a U.S. National Phase application under 35 U.S.C. § 371 of International Application No. PCT/EP2021/062846, filed on May 14, 2021. The International Application was published in English on Nov. 17, 2022 as WO 2022/237987 A1 under PCT Article 21(2).

FIELD

The present invention relates to a method for decision-making regarding a decision in an environment by means of a data processing system.

Further, the present invention relates to a data processing system for decision-making regarding a decision in an environment.

BACKGROUND

Methods and data processing systems for decision-making are known from prior art. Corresponding prior art documents are listed as follows:

[1] Wang, Zhiyuan, and Gade Pandu Rangaiah. "Application and analysis of methods for selecting an optimal solution from the Pareto-optimal front obtained by multi-objective optimization." *Industrial & Engineering Chemistry Research* 56.2 (2017): 560-574.

[2] García-Durán, Alberto, and Mathias Niepert. "Learning graph representations with embedding propagation." In Advances in Neural Information Processing Systems (2017): 5125-5136.

[3] Garcia-Duran, Alberto, and Mathias Niepert. "Kblrn: End-to-end learning of knowledge base representations with latent, relational, and numerical features." In Proceedings of the 34th Conference on Uncertainty in Artificial Intelligence. 2018.

[4] Alyoubi, Bader A. "Decision support system and knowledge-based strategic management." Procedia Computer Science 65 (2015): 278-284.

[5] Sutton, Reed T., et al. "An overview of clinical decision support systems: benefits, risks, and strategies for success." NPJ digital medicine 3.1 (2020): 1-10.

[6] Chernov, Alexey V., Victoria A. Chernova, and Tatiana V. Komarova. "The Usage of Artificial Intelligence in Strategic Decision Making in Terms of Fourth Industrial Revolution." 1st International Conference on Emerging Trends and Challenges in the Management Theory and Practice (ETCMTP 2019). Atlantis Press, 2020.

[7] Rout, Jitendra Kumar, Minakhi Rout, and Himansu Das, eds. Machine Learning for Intelligent Decision Science. Springer Singapore, 2020.

Further prior art reference "Hybrid Ontology-based knowledge with multi-objective optimization model framework for Decision Support System in intercropping", Rajamangala University of Technology Srivijaya Universiti Utara Malaysia, August 2017, discloses a decision support system for planting rubber and relationships for intercropping with integrated multi-objectives optimization to recommend the crop to be planted. This Decision Support system extracts information from various organizations. Problems related to multi objective crop planning are also discussed. Pareto based approaches for selecting best result is also discussed within the reference.

Further prior art reference "TITAN: Future Forecast using Action Priors", Honda Research Institute, Mar. 31, 2020, discloses a new model Trajectory Inference using Targeted Action priors Network, TITAN, for predicting future trajectory of scene agents obtained from a moving platform. Decision making and future forecasting are done by using labelled video clips TITAN dataset.

Further prior art reference "Recurrent Event Network: Autoregressive Structure Inference over Temporal Knowledge Graphs", Woojeong Jin, Meng Qu, Xisen Jin, Xiang Ren, Nov. 16-20, 2020, discloses a Recurrent Event Network, RE-NET, for predicting the future interaction. Prediction is done on five TKG dataset. The reference also discusses a temporal and multi relational graph and ranking all the events.

Further prior art reference "Dynamic Knowledge Graph Ai Framework And Support In Decision Making", Yewno Data Science, 2020, discloses a knowledge graph, YKG, for dynamic representation of documents over time (future forecast). YKG is constructed by gathering knowledge from different data sources.

In general, a decision support system reflects an information system that supports business or organizational decision-making activities. Unfortunately, although the term "Decision Support" seems rather intuitive and simple, it is in fact very loosely defined. In this document, we focus on knowledge-based decision support systems, KBDSS, i.e., systems which effectively use appropriate data, information, and knowledge to support a decision in a timely manner.

Domains like public safety and public services have become more and more complex and distributed. Hence, systems like KBDSS play a key role in making decisions as more information, people, requirements, and restrictions may be taken into account.

SUMMARY

In an embodiment, the present disclosure provides a method for decision-making regarding a decision in an environment by a data processing system in view of multiple different objectives. The method includes: collecting information within the environment, describing the information in at least one temporal knowledge graph (TKG), forecasting a future development of a state, wherein the forecasting the future development comprises determining one future state or more future states at a future time or more future points in time, under different decisions by the at least one TKG; describing each resulting future state/decision combination by a corresponding temporal knowledge graph; rating an adherence of each forecasted future state to each objective of the multiple different objectives; considering a trade-off between the objectives for decision-making in a time-aware manner; and providing the decision.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
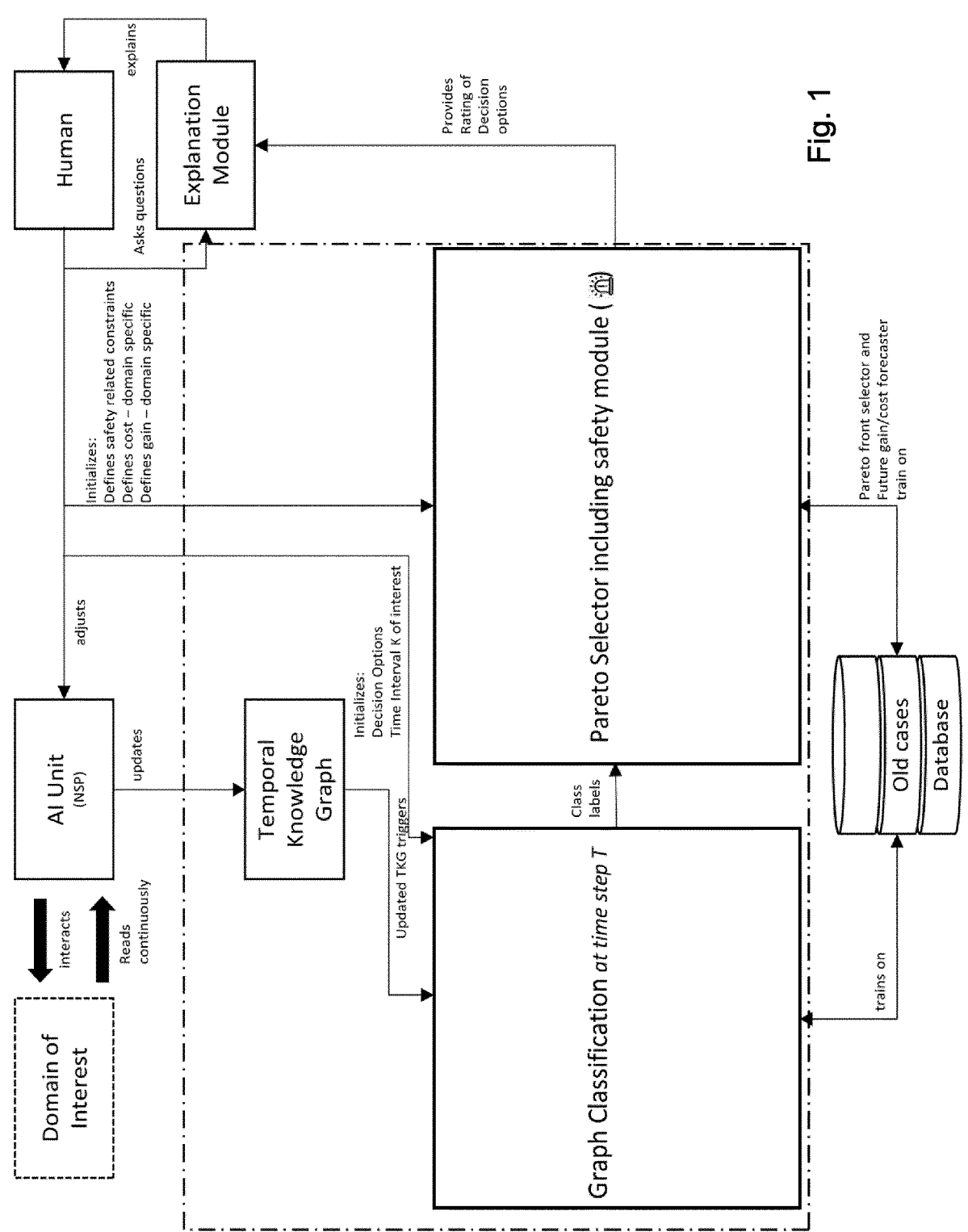
FIG. 1 shows in a diagram system components of an embodiment of a data processing system according to the present invention.

Nowadays a decision is not necessarily flat, i.e., it is not only about which actions to take to achieve a certain goal. De facto, a decision has to be sustainable, should be fair for everyone, as well as effective, and cheap in terms of costs. These are obviously conflicting parameters which need to be balanced; hence, a suitable trade-off needs to be determined. Moreover, also the aspect of time plays a critical role as the problem of interest might evolve over-time—and after—while actually trying to come up with a decision. This essentially means that a decision has to be made in view of multiple—possibly conflicting—objectives and time. Indeed, this includes not only the aspect that the situation might change over time but also at which point in time to execute the actual decision.

In accordance with an embodiment, the present invention improves and further develops a method for decision-making regarding a decision in an environment by means of the data processing system and a corresponding data processing system for providing an efficient decision-making by simple means.

In accordance with another embodiment, the present invention provides a method for decision-making regarding a decision in an environment by means of a data processing system, wherein decision-making is performed in view of multiple different objectives, comprising the following steps:

collecting information within the environment;

describing the information in at least one temporal knowledge graph, TKG;

forecasting a future development of a state, i.e. one future state or more future states at a future time or more future points in time, under different decisions by means of at least one temporal knowledge graph;

describing each thus resulting future state/decision combination by a corresponding temporal knowledge graph;

rating an adherence of each forecasted future state to each objective;

considering a trade-off between the objectives for decision-making in a time-aware manner; and providing the decision.

In accordance with another embodiment, the present invention provides a data processing system for decision-making regarding a decision in an environment, wherein decision-making is performed in view of multiple different objectives, comprising:

collecting means for collecting information within the environment;

describing means for describing the information in at least one temporal knowledge graph, TKG;

forecasting means for forecasting a future development of a state, i.e. one future state or more future states at a future time or more future points in time, under different decisions by means of at least one temporal knowledge graph;

describing means for describing each thus resulting future state/decision combination by a corresponding temporal knowledge graph;

rating means for rating an adherence of each forecasted future state to each objective;

considering means for considering a trade-off between the objectives for decision-making in a time-aware manner; and providing means for providing the decision.

According to the invention it has been recognized that it is possible to provide a very efficient decision-making by simply using information collecting within the environment and describing the information in at least one temporal knowledge graph. The further development of a state can concretely refer to a state in the environment. The forecasting step is performed under different decisions simply by means of at least one temporal knowledge graph. A resulting future state/decision combination can be described by a corresponding temporal knowledge graph at each relevant future point in time or at each time step. The rating of an adherence of each forecasted future state to each objective further simplifies decision-making and makes decision-making very efficient.

Thus, on the basis of the invention an efficient decision-making is provided by simple means.

According to an embodiment of the invention the decision can refer concretely to a social or residential environment, more concretely to a behavior in a social or residential environment. The terms "social" or "residential" can be seen in a way or sense with regard to an environment, where humans are involved in any way. An environment can be a technical environment, with or without humans.

According to a further embodiment the information can be collected by observation and interaction, preferably in a respective social or residential environment of interest. Thus, due to the possibility of collecting a lot of real information, an efficient decision-making is possible.

Within a further embodiment the forecasting step can rely on a machine learning, ML, model. A lot of information can be processed by such a machine learning model in short time resulting in an efficient and simple decision-making.

According to a further embodiment, in the rating step a classification based on graph embedding can be used. This feature provides a reliable and effective classification method.

In a further embodiment the classification can consist of the steps: future knowledge graph forecasting, graph embedding and classification. By such a triple of steps an efficient decision-making is possible.

According to a further embodiment, in the rating step one classifier can be used for each objective. As a result a very sophisticated classification method can be provided leading to an efficient decision-making.

Within a further embodiment, in the considering step a multi-objective optimization can be used. In a further embodiment the multi-objective optimization can comprise predicting at least one future label of each decision, preferably regarding a definable point in time or definable time steps.

Further embodiments can provide rating each state's adherence to each objective using classification, leading to one label per objective, where the labels are independent from each other, and can further provide forecasting how each of the labels will develop in the future, wherein a decision can also be made at a later step in time, which could lead to a different outcome.

According to a further embodiment the multi-objective optimization can comprise the use of a Pareto-front selector, so that the decision can be provided on the basis of a Pareto-front selection, wherein preferably a selection method comprises FUCA, wherein FUCA means "Faire un Choix Adequat". A trade-off between multiple objectives can be provided in a time-aware manner by using such a Pareto-front selector.

In a further embodiment the Pareto-front selector can incorporate a forecast uncertainty in an additional factor and can train its weights on previous cases from a database. This will result in a reliable and effective decision-making.

According to a further embodiment the Pareto-front selector can provide the steps: Pareto-graph creation and decision-making among Pareto-options, wherein optionally a future label forecasting can be provided. As a result of this feature an enhanced Pareto-front selector is provided leading to a very efficient decision-making by simple means.

Within a further embodiment the decision can be provided by an explanation module, wherein the explanation module is adapted to interact with a user. Such a module also provides an efficient decision-making on the basis of a very functional structure of the data processing system.

According to a further embodiment the temporal knowledge graph can be updated as soon as new information is available. This will result in reliable decisions on the basis of actual information.

In further embodiments the environment can refer to public domains, to public safety, for example together with a control room or law enforcement, for example for traffic monitoring and adjustment, to public services, for example in a job center for providing intelligent assignment and routing, to governmental institutions, to a smart city with a smart grid system, to health care, for example in the field of drug development, or to the biomedical field. Other application fields are possible.

Advantages and aspects of embodiments of the present invention are summarized as follows:

1. Each decision can be made under certain circumstances in a certain situation. This underlying situation—state—for decision making and the changes introduced by certain decisions can be described as knowledge graphs or temporal knowledge graphs, TKG, in order to take into account information about relations between entities.
2. The dynamicity—taking and executing a decision now leads to a change in state, but this state can change over time—of states in decision-making can be considered by forecasting the state at a future time step of interest under certain decisions, where states are described by TKGs.
3. The decision options can be described, embracing the (a) multi-faceted nature of objectives and (b) multiple possible time steps by
   a. rating each state's adherence to each objective using classification, leading to one label per objective, where the labels are independent from each other, and
   b. forecasting how each of the labels will develop in the future (a decision can also be made at a later step in time, which could lead to a different outcome),
   which leads to two labels per time step and decision option as a basis for decision making.

4. Decision-making can incorporate (a) the trade-off between the multiple objectives in (b) a time-aware manner, by using an enhanced Pareto-front selector, which
   a. trains its weights—judging the importance of each objective—on previous cases from a database, and
   b. incorporates the forecast uncertainty in an additional factor.

Further advantages and aspects of embodiments of the present invention are summarized as follows:

1. Information can be collected in the domain or environment of interest through observation and interaction. This information can be organized in a Temporal Knowledge Graph, TKG.
2. The future development of a state can be forecasted under certain decisions, wherein each state&decision combination at each time step can be described by a Temporal Knowledge Graph. The forecasting can rely on a ML model.
3. Each expected state's adherence can be rated to each objective using classification based on graph embedding: Use one classifier for each objective.
4. The trade-off between the multiple objectives for decision making can be considered in a time-aware manner, using multi-objective optimization:
   a. predict the future labels of each decision option over time steps
   b. use an enhanced Pareto-front selector, which incorporates the forecast uncertainty in an additional factor, and trains its weights on previous cases from a database
5. A decision can be made based on the enhanced Pareto-front selection.

The conventional decision-making process of a Decision Support System, DSS, is an iterative process and consists essentially of the following steps: "Problem Recognition", "Problem Definition", "Alternative Generation", "Model Development", "Alternate Analysis", "Choice", and "Implementation", see [4]. During the last decades, DSSs have further evolved and include nowadays also AI-based components and rely on knowledge bases, see [5], with various applications, e.g. supporting medical decisions, see [5]. However, the usage of artificial intelligence in strategic decision making is still at an early stage, see [6]. Indeed, there seem to be a trend where DSSs are combined with Decisions Science based approaches. Decision science is the process of selecting logically a best choice from the available options to make an appropriate decision, see [7]. Further, decision science is considered as a hub of knowledge networks connecting disciplinary and interdisciplinary sciences with the practice of problem-solving.

Comparing embodiments of our invention with state-of-the-art DSSs, e.g., [5], it points out that a) they compute a decision based on a snapshot of (multi-modal) data, b) don't take potential follow-up problems into account but handle them independently, and c) don't rely on a graph structure to exploit the data. In contrast, embodiments of our invention are capable of handling several data snapshots, preferably of different points in time, simultaneously. Further, based on the data they can forecast the further development. As a consequence, embodiments of our invention are not only able to compute a decision which leads to the desired outcome—short and intermediate changes—but also to analyze the impact—longer-term changes—of the decision. The fact that embodiments of our invention rely on a graph-structure to capture all data, essentially enables that we can rely not only on simple rules or patterns for decision finding but can exploit high-order features (e.g., motifs) which are captured by the graph structure.

Taking also Decision Science into account, see [7], decision scientists frame data analysis in terms of the decision making process but rely usually on different methodologies across different fields (interdisciplinary). More precise, data scientists focus on finding insights and relationships which relate to the decision at-hand. Considering the field of artificial intelligence, to the best of our knowledge, there is no DSS which relies on a Temporal Knowledge Graph and uses graph classification to rate each state while considering that each objective is adherence, and subsequently forecasts how each of the outcomes will develop in the future.

Embodiments of the invention can be used in many applications where decisions based on dynamic situation and relational data have to be taken. For example, it can be used in any instance where sensor networks are available to observe the domain, such as in the public services, public safety or biomedical domains. A differentiator to classical multi-objective decision-making is that embodiments of our invention have the capability to take time into account together with relational data, i.e., the system can capture and understand complex issues and evolving situations.

Embodiments of the invention can take place in public environments or domains, e.g., public safety, public service, and governmental institutions. Laws and regulations within Europe but also other countries like Japan, require transparency and traceability; hence, the functionality of the system may be disclosed to avoid unequal treatment or other social preferences.

Due to the amount of information and the increasing complexity embodiments of the present invention provide AI-based support backed by Knowledge Graphs as it is able to capture complicated patterns and relations.

Embodiments of the present invention generally refer to a time-aware multi-objective decision making based on Temporal Knowledge Graphs.

Further embodiments comprise a system for decision-making, which embraces the relational and dynamic nature of underlying situations, and incorporates the trade-off between the multiple objectives in a time-aware manner. It continuously collects information from a domain or environment of interest and organizes the information in a Temporal Knowledge Graph. Being aware that advancement of time can lead to a change of state, it forecasts the future states of the TKG under certain decisions at a time step of interest. Further, it rates each state's compliance to the user-defined objectives by assigning labels, preferably one label per objective, using a classifier based on graph embedding. To consider the trade-off between the multiple objectives in decision making, embodiments can incorporate a Pareto-front selection module, preferably with an enhanced time-aware selection formula.

There are several ways how to design and further develop the teaching of the present invention in an advantageous way. To this end it is to be referred to the following explanation of examples of embodiments of the invention, illustrated by the drawing.

Figure 2:
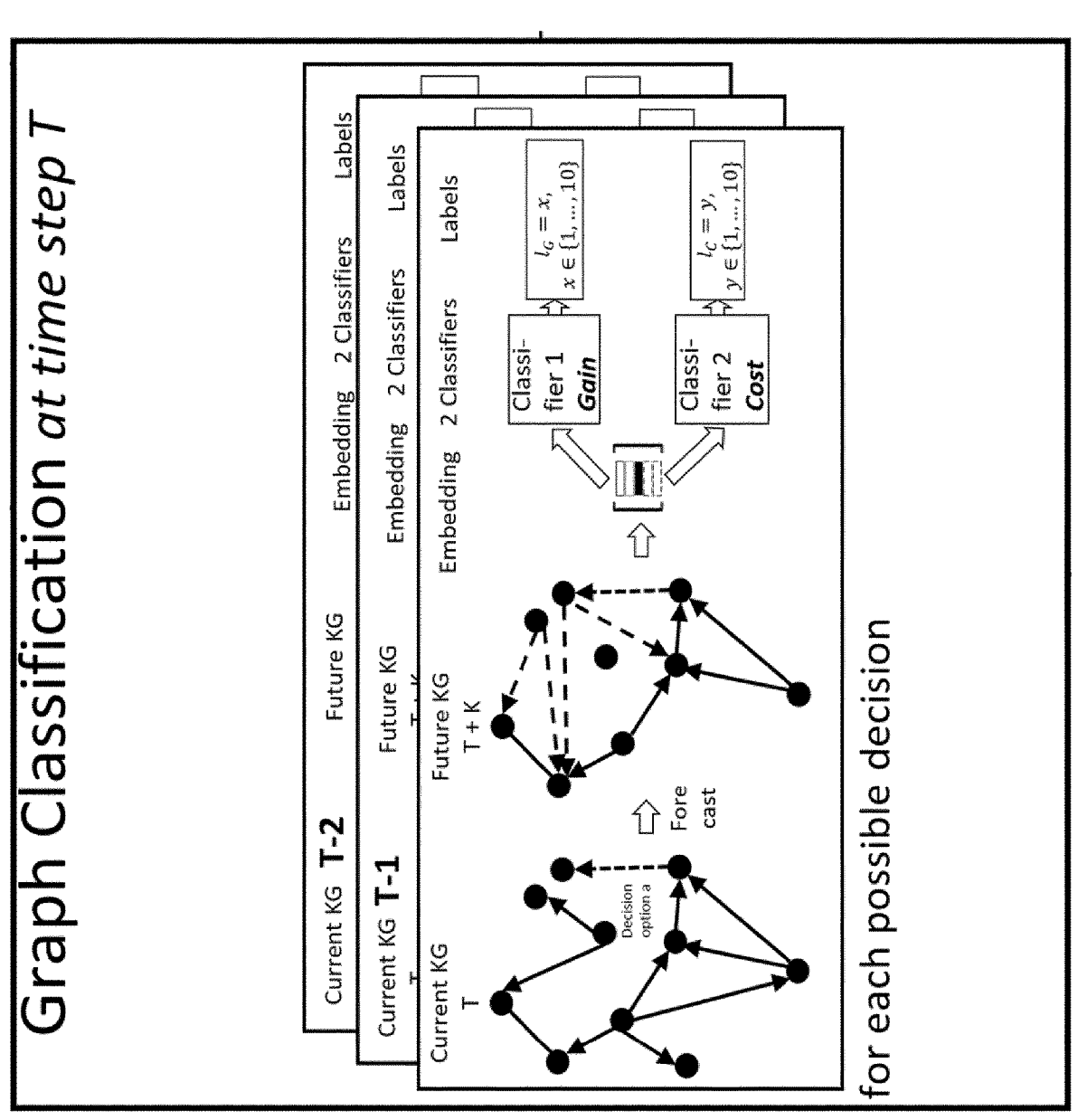
FIG. 2 shows in a diagram the graph classification module of the system of FIG. 1.
Figure 3:
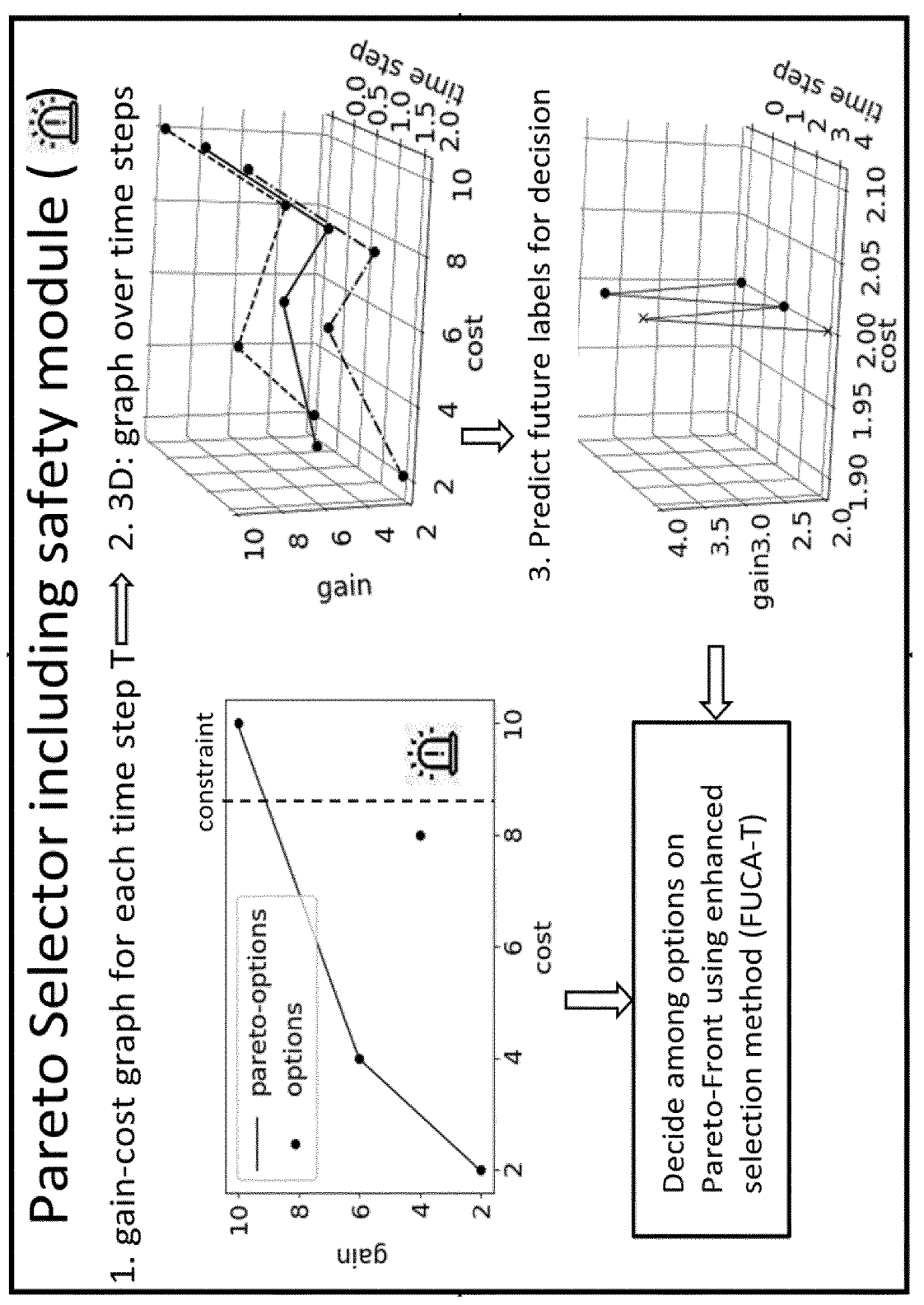
FIG. 3 shows in a diagram the Pareto Selector module of the system of FIG. 1.

A data processing system according to an embodiment of the invention includes multiple modules, see FIG. 1: An AI Unit which dynamically interacts with the domain of interest in order to continuously gain more information. The AI Unit can also take into account instructions from a user. The AI Unit stores the information found in a Temporal Knowledge Graph, TKG. Further, a Graph Classification Module, see FIG. 2, to forecast the situation at time of interest and to assign class labels, describing the adherence of the situation to each objective. In addition, a Pareto Selector, see FIG. 3, to make decisions based on the class labels, and forecast future class labels, thus incorporating the multiple objectives and the time aspect. The system also includes an explanation module to provide the decisions as well as explanations to the users, and to interact with the user. In the following, the respective modules are described in detail.

The AI Unit, e.g., a bot, observes/reads/interacts (with) a domain of interest, e.g., place of crime, an online community, or a smart city. Everything which is logged/observed, e.g., through a sensor network, by the AI Unit is transformed into a Temporal Knowledge Graph, TKG, i.e., a set of triples. This set of triples represents entities and objects, relations between them, and corresponding attributes. The AI Unit updates the TKG as soon as new findings are available. An Update of the TKG triggers the Graph Classification module.

The Graph Classification module takes 1) the newest KG-$KG_T$, where T is a time step that refers to the present, 2) user configuration settings including the decision options—e.g., intervene, wait and see, and adapt monitoring—and the time interval K of interest, where K≥0, and 3) old cases from the database (e.g., previous cases in form of TKG, decisions and outcomes—rated on adherence to the objectives). The Graph Classification module consists of several steps: A) Future Knowledge Graph Forecasting, B) Graph Embedding, C) Classification. Its output are class labels $l_{d,o}$ for each objective o for each decision option d. If, for example, there are two objectives—gain, cost—and two decision options—wait, take action—, the Graph Classification module will return two labels per decision option, rating the expected gain and cost (at time T+K), when deciding to wait, and likewise rating the expected gain and cost when deciding to take action. The steps are explained in the following:

A. Future Knowledge Graph Forecasting: The Future Knowledge Graph Forecasting constitutes of a neural network, trained with stochastic gradient descent, SGD, using the Knowledge Graphs from previous time steps ($KG_T$, $KG_{T-1}$, $KG_{T-2}$, ... ). It produces a new Knowledge Graph $KG_{T+K}$, which represents the future of the input KG, i.e., the attributes of the entities and object can change, it might have new edges and nodes, and preexisting nodes and edges can vanish.

B. Graph Embedding: This step learns a vector representation $v_{T+K}$ of the graph $KG_{T+K}$ by passing messages between neighboring nodes, see [2].

C. Classification: Classifiers, in this case random forest models, are trained on old cases from the database, one classifier for each objective, e.g. one classifier for rating the gain, one for rating the cost. Embodiments of the invention use separate classifiers for the separate objectives in order to ensure to rate the objectives independently from each other. The features for the classifier are the graph embeddings—a graph embedding is a vector—, and the target it the label describing the respective objective.

The Pareto Selector module takes as input 1) the class labels $l_{d,o}$ from the Graph Classification module, 2) user configuration settings including safety related constraints, e.g., the cost should never be >8, and 3) old cases from the database, i.e. previous cases in form of TKG, decisions and outcomes. As output it provides a list of rated decisions together with their class labels. The module consists of multiple steps, A) Pareto-Graph Creation, B) optional-Future Label Forecasting, and C) Decision-making among Pareto-options:

A. Pareto-Graph Creation: Create a graph for each time step T, $G_T$, with axes representing the objectives, e.g. cost and the gain, see FIG. 1, Pareto Selector, Step 1: Gain-cost graph for each time step. Enter the labels for the decision options in the graph, exclude all options that exceed the predefined safety-constraints, pre-select all options from the Pareto-front. If multiple time steps x have passed already, create a second graph, with an additional axis representing the time steps, and enter all $G_T$, $G_{G-1}$, $G_{T-x}$, see FIG. 1, Pareto Selector, Step 2:3D:graph over time steps.

B. optional—Future Label Forecasting: For each decision option, if multiple time steps x have passed already: Predict the future labels for the decision at future time steps $T+T_f$, using a machine learning based time series forecasting model, e.g., Long short-term memory. This step is optional, because the invention does not have to take into account the future labels for decision making but can also decide only among present labels, e.g. in case not enough time steps x have passed to train a time series forecasting model.

C. Decision-making among Pareto-options: Select a decision option from all options in the graph. Use the Adapted Pareto-Front Selection method as following:

Selection Method: Faire Un Choix Adequat (FUCA)

Concept: For each of the objectives, assign rank 1 to the best value and assign rank m to the worst value. Computes for each solution in the Pareto-optimal front a weighted summation:

$$v_i = \sum_{j=1}^{n} (r_{ij} \times w_j)$$

where $r_{ij}$ is the rank of action i for objective j, n is the number of objectives (in our case n=2: gain, cost), $w_j$ is the weight of objective j.

FUCA selects the solution that has the smallest overall rank value, see [1].

The advantage of FUCA as compared with other methods is that its principle is relatively simple [1], and, compared to other methods, it shows good efficiency. Another advantage of FUCA is that it ranks all the solutions from the best one to the worst one. However, it still requires weightage values from the user, see [1].

Adapted FUCA to consider Time—FUCA-T: We adapt the FUCA to consider the time aspect for embodiments of this invention: An action can either be done now, or in any future time step. Because of forecasting uncertainty, actions in future time steps should be given a lower weight. Thus, we extend FUCA with an additional factor, called T-factor:

$$v_i = \left( \sum_{j=1}^{n} (r_{ij} \times w_j) \right) \left( \frac{1}{1 + w_f T_f^2} \right)$$

$$w_f \geq 0$$

where $w_f$ is the weight of the future scale factor, and $T_f$ represents the number of steps into the future (for the current time step $T_f=0$, for $T+1:T_f=1$). The T-factor is 1 for the current time step, and decreases for higher time steps. Further, we have $0 \leq$ T-factor $\leq 1$ for all time steps.

The weights for FUCA: The weights can either be set by an experienced user, e.g., when it is much more important to have a high gain than a low cost: set weights for the objective gain high, and weights for objective cost low. As an alternative, embodiments of the invention present a Pareto Front Selector weight Training ($w_j$, $w_f$): It Identifies related cases in the data base, and trains the weights for Pareto Selection based on outcomes of old cases using a regression model. This circumvents the problem of needing an expert user to set the weights.

The output of the Pareto Selector Module is passed to the Explanation Module which transforms the input into an appropriate representation, e.g. text, images, voice, i.e., it provides an explanation to the human which decisions are expected to be optimal for the given objectives, and why and how it effects the development. The user can interact with the module, i.e., ask questions for clarifications which results in an adaptation of the representation of the explanation. Based on the findings, the user can adapt the list of possible decisions, the safety constraint, and/or instruct the actual AI unit which monitors and interacts with the domain of interests. Alternatively, the human can be omitted but our system can directly adapt or modify the AI unit or other systems.

Further Embodiments

1. Public Safety: Control Room

A control room or operations room is a room serving as a central space where a large physical facility or physically dispersed service can be monitored and controlled. As a consequence, various units like call handlers, police in the field, but also the infrastructure can be considered as continues stream of information. This information is the base for decision making, e.g., in terms of operation management. Relying on a temporal knowledge graph allows to model all information in a consistent way and in a united data model, capturing the relations between entities, e.g., locations or people involved, as well as time information, e.g., time slots of availability. Decision making is a crucial part as not only the decision itself but also the point-in-time of the execution matters. In this context, embodiments of our invention are able to take all of these aspects into account to support decision making and to optimize the trade-off between cost and gain. Considering a hostage situation, embodiments of the invention help to determine when to seizure by analyzing the state of knowledge, the risk for the hostage, and the actual outcome. The output of the system can be used/evaluated by a human to adjust negotiation robots or monitoring sensor networks, e.g. drones—unmanned aerial vehicles—equipped with cameras monitoring the system. Those unmanned aerial monitoring vehicles—Drones with cameras—can be automatically adjusted to improve monitoring of the current situation. Alternatively, these systems can be directly adjusted without the human in the loop.

2. Public Safety: Law Enforcement for Traffic Monitoring and Adjustment

Dark web message boards and marketplaces are a hot spots for illegal activities. Monitoring them is crucial to reveal criminal networks. The information which are exchanged on those platforms be it messages or images are the base for decision making, i.e., to try to take down content or continue to observe. Relying on a temporal knowledge graph, allows to model the relations between the users but also embed their content and actions. In this context, embodiments of our invention are able to take all of these aspects into account to support decision making and to optimize the trade-off between information gain and the actual outcome. Considering a community which exchanges illegal content, embodiments of the invention help to decide whether to stop the content dealing or to continue to monitor the community which might go along with an increased harm level but might also help in uncovering the criminals. The output of the system can be used/evaluated by a human to adjust an AI bot for communication but also to adapt a traffic monitoring system to interrupt or modify the network traffic. Alternatively, these systems can be directly adjusted without the human in the loop.

3. Public Services: Job Center-Intelligent Assignment and Routing System

Case workers in a job center are responsible of the unemployed people. They have to group and assign them to activities like a particular training or some integration program which should increase the chance of actually getting a new job. For unemployed people it is a lengthy and tortuous process to even be assigned a fitting case worker and/or training in the first place, due to long waiting lists, and unsuitable matches between unemployed and case workers with a fitting skills set, e.g., it is beneficial to have a case worker knowing about the technical background of available training opportunities for a person who seeks employment in computer science.

Curricula vitae, education, work experience, available training, job market and other parameters should be taken into account to actually make a decision which case worker assign to which person.

Relying on a temporal knowledge graph allows to model an unemployed person including all of the mentioned parameters and the change of their situation over time. Moreover, people can be actually linked in terms of similar cases. In this context, embodiments of our invention are able to take all of these aspects into account to support decision making and to optimize the trade-off between gain—success in job assignment—and cost—time/money needed for job assignment. Considering the case of assigning the best fitting case worker to an unemployed person, embodiments of our invention have to decide which measures to take, e.g. keep a person on the waiting list until a more qualified case worker is available, assign the person directly to a costly training course or training agent—skipping the case worker—, or assign the person to a case worker without special skills, and which skill set the case worker should bring.

Compared to a standard decision support system, embodiments of our invention consider the chance/probability how long it takes to assign the matching case worker due to waiting lists, and the long time benefits, a case worker with matching skill set or a training course would have.

The output of the system can be used to adapt an intelligent call routing system. The route connects the unemployed person automatically and directly to the most capable agent which is available or decides to assign the person to a waiting list. The intelligent routing systems incorporate data from all other cases and interactions to balance the load and to optimizing the satisfaction and to reduce the waiting time.

4. Smart City: Smart Grid System

In a smart city, things like traffic monitoring and management, pollution monitoring, water quality monitoring, are automatically handled. The smart sensor network of the city is a reach source of information and allows to adjust accordingly. Relying on a temporal knowledge graph, allows essentially to model the whole city as a graph where places are nodes and monitoring units are represented as respective features. In this context, embodiments of our invention are able to take all of these aspects into account to support decision making and to optimize the trade-off between information gain and the actual outcome. Considering the case of a smart grid/electricity system where load balancing/distribution depends on several factors as on the one hand the energy is produced by renewables like wind power and on the other hand the consumption varies strongly and depends on the time of day due different consumer of electricity like electrical cars. To keep such a system stable, it might help to cut certain power stations, separate the network, or redirect the electricity. Embodiments of our invention allow to decide whether one of the described actions should be executed or if it is actually fine to accept certain fluctuation as they might also for a short period of time. Embodiments of our invention essentially have to analyze the trade-off between the disadvantage of the consumer—e.g., public transport or hospitals might have short-term failures—or the potential damage to the grid. The output of our system can be used/evaluated by a human to adjust certain components of the electrical network such as electrical substations, e.g., to separate certain layers of the electrical network. Alternatively, these systems can be directly adjusted without the human in the loop.

5. Health Care: Drug Development

The development of drugs goes along with so called wet lab experiments. A wet lab is a type of laboratory in which a wide range of experiments are performed, including characterizing of enzymes in biology and, titration in chemistry. As a consequence, wet lab experiments take time and are expensive and at the same time there are an enormous amount of possible combinations which can be analyzed. Therefore, researcher have to decide at some point whether it is worth to continue the wet-lab experiments for a particular drug or to continue with the next step. Relying on a temporal knowledge graph allows to model the complex structure between drugs, proteins and disease and also to incorporate the related attributes as features. In this context, embodiments of our invention are able to take all of these aspects into account to support decision making and to optimize the trade-off between cost—e.g. time, money—and potential gain—e.g. information gain. Considering the outlined use case, embodiments of our invention allow to decide whether it is worth to analyze additional further proteins in respect of the drug of interest. Thus, it helps to understand and decide if further wet lab experiments would go along with a—significantly—more effective drug. The output of the system can be used/evaluated by a human to adjust the machine for the wet lab experiments, e.g., autoclave or spectrophotometer. Alternatively, these systems can be directly adjusted without the human in the loop.

Input to the system: Set of known knowledge in the form of triples $t=(s, r, o)$ where s is a subject, r is a relation and o an object. Subjects and objects are for example proteins and drugs and relations describe the relationship that holds between a subject and an object. The temporal aspect can be encoded in the relations, e.g., the relation between a drug and a protein can be annotated with the duration of effect.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for decision-making regarding a decision in an environment by a data processing system, wherein decision-making is performed in view of multiple different objectives, the method comprising:
collecting information within the environment;
describing the information in at least one temporal knowledge graph (TKG);
forecasting a future development of one future state or more future states at a future time or more future points in time, under different decisions by the at least one temporal knowledge graph;
describing each resulting future state/decision combination by a corresponding temporal knowledge graph;
rating an adherence of each forecasted future state to each objective of the multiple different objectives;
considering a trade-off between the different objectives for decision-making in a time-aware manner; and
providing the decision.

2. The method according to claim 1, wherein the information is collected by observation and interaction.

3. The method according to claim 1, wherein the forecasting step relies on a machine learning (ML) model.

4. The method according to claim 1, wherein in the rating step uses a classification based on graph embedding.

5. The method according to claim 4, wherein the classification comprises: future knowledge graph forecasting, graph embedding and classification.

6. The method according to claim 1, wherein in the rating step, one classifier is used for each objective of the multiple different objectives.

7. The method according to claim 1, wherein in the considering step uses a multi-objective optimization.

8. The method according to claim 7, wherein the multi-objective optimization comprises predicting at least one future label of each decision.

9. The method according to claim 8, wherein the at least one future label of each decision is regarding a definable point in time or definable time steps.

10. The method according to claim 7, wherein the multi-objective optimization comprises the use of a Pareto-front selector, and wherein the decision is provided on the basis of a Pareto-front selection.

11. The method according to claim 10, wherein the Pareto-front selector incorporates a forecast uncertainty in an additional factor and trains its weights on previous cases from a database.

12. The method according to claim 10, wherein the Pareto-front selector provides the steps: Pareto-graph creation and decision-making among Pareto-options.

13. The method according to claim 12, wherein a future label forecasting is provided.

14. The method according to claim 1, wherein the decision is provided by an explanation module, and wherein the explanation module is adapted to interact with a user.

15. The method according to claim 1, wherein the temporal knowledge graph is updated as soon as new information is available.

16. The method according to claim 1, wherein the environment includes public domains, public safety, public services, governmental institutions, and/or health care.

17. The method according to claim 16, wherein the public domain environment comprises a control room or law enforcement and traffic monitoring and adjustment.

18. The method according to claim 16, wherein the public services environment comprises a job center for providing intelligent assignment and routing, and wherein governmental institutions environment comprises a smart city with a smart grid system.

19. The method according to claim 16, wherein the healthcare environment comprises drug development, or the biomedical field.

20. A data processing system for decision-making regarding a decision in an environment, wherein decision-making is performed in view of multiple different objectives, the data processing system comprising:
collecting means for collecting information within the environment;
describing means for describing the information in at least one temporal knowledge graph (TKG);
forecasting means for forecasting a future development of one future state or more future states at a future time or more future points in time, under different decisions by the at least one temporal knowledge graph;
describing means for describing each resulting future state/decision combination by a corresponding temporal knowledge graph;
rating means for rating an adherence of each forecasted future state to each objective of the multiple different objectives;
considering means for considering a trade-off between the different objectives for decision-making in a time-aware manner; and providing means for providing the decision.

* * * * *